(12) United States Patent
Ward

(10) Patent No.: US 6,836,946 B2
(45) Date of Patent: Jan. 4, 2005

(54) METHOD AND APPARATUS FOR REMOVING NAILS FROM TAPE

(76) Inventor: Terry C. Ward, 226 Lansbrooke Dr., Chesterfield, MO (US) 63005

(*) Notice: Subject to any disclaimer, the term of this patent is extended or adjusted under 35 U.S.C. 154(b) by 0 days.

(21) Appl. No.: 10/007,069

(22) Filed: Dec. 5, 2001

(65) Prior Publication Data

US 2003/0101563 A1 Jun. 5, 2003

(51) Int. Cl.[7] ............................ B23P 19/00; B25C 11/00
(52) U.S. Cl. ........................... 29/426.3; 29/244; 29/253; 29/426.5; 29/823; 254/18; 254/25
(58) Field of Search ........................ 29/244, 247, 253, 29/426.3, 426.5, 822, 823, 824; 254/18, 21, 22, 25

(56) References Cited

U.S. PATENT DOCUMENTS

| | | | |
|---|---|---|---|
| 1,317,156 A | | 9/1919 | Diamond |
| 1,432,847 A | * | 10/1922 | Geiger .......................... 254/18 |
| 1,461,712 A | * | 7/1923 | Ellis ............................. 254/18 |
| 1,605,662 A | | 11/1926 | Kayser |
| 1,612,793 A | * | 1/1927 | Beetz ........................... 254/18 |
| 1,632,799 A | | 6/1927 | Moore |
| 1,765,885 A | * | 6/1930 | Scherm, Jr. ................... 227/63 |
| 1,789,256 A | * | 1/1931 | Rogers ......................... 254/18 |
| 1,835,681 A | | 12/1931 | Wallace |
| 1,840,858 A | * | 1/1932 | Titus ............................ 254/18 |
| 1,897,801 A | | 2/1933 | Healy |
| 2,206,253 A | | 7/1940 | Griffin et al. |
| 2,260,767 A | * | 10/1941 | Black et al. .................. 254/18 |
| 2,271,311 A | * | 1/1942 | Shambaugh ................. 254/104 |
| 2,446,741 A | | 8/1948 | Chidakel |
| 2,522,769 A | | 9/1950 | Anderson |
| 2,570,914 A | * | 10/1951 | Buck ............................ 254/18 |
| 2,612,949 A | * | 10/1952 | McDaniel ..................... 83/102 |
| 2,650,061 A | * | 8/1953 | Denovan et al. .............. 254/18 |
| 2,704,198 A | * | 3/1955 | Dobbin, Jr. .................. 254/18 |
| 3,038,701 A | * | 6/1962 | Sainio .......................... 254/18 |
| 3,588,043 A | * | 6/1971 | Griswold ...................... 254/18 |
| 4,334,945 A | * | 6/1982 | Raush ......................... 156/344 |
| 4,775,089 A | * | 10/1988 | MacDonald .................. 227/2 |
| 6,443,428 B1 | * | 9/2002 | Santibanez et al. ........... 254/18 |
| 6,481,691 B1 | * | 11/2002 | Irving ......................... 254/28 |

* cited by examiner

*Primary Examiner*—Essama Omgba
(74) *Attorney, Agent, or Firm*—Thompson Coburn, LLP

(57) ABSTRACT

An apparatus for removing nails from a tape is provided. The apparatus comprises a guide that directs a path of movement of the tape through the apparatus. The guide has a transition end over which the tape passes as the tape moves through the apparatus. The guide transition end is adapted to form a bend in the tape thereby exposing a head of the nail from the tape as the tape passes over the guide transition end. The apparatus further comprises a claw that is adapted to engage the nail head as the nail head is exposed when the tape passes over the guide transition end.

21 Claims, 2 Drawing Sheets

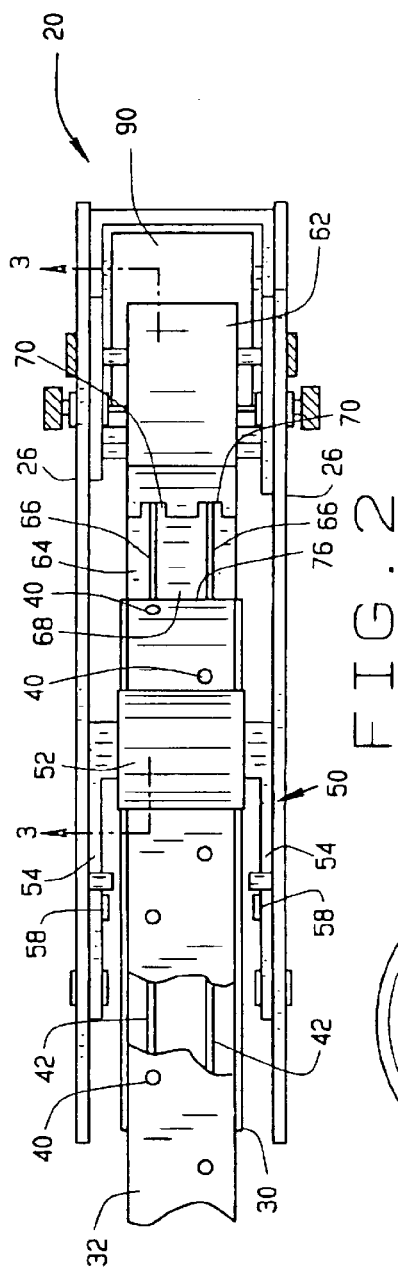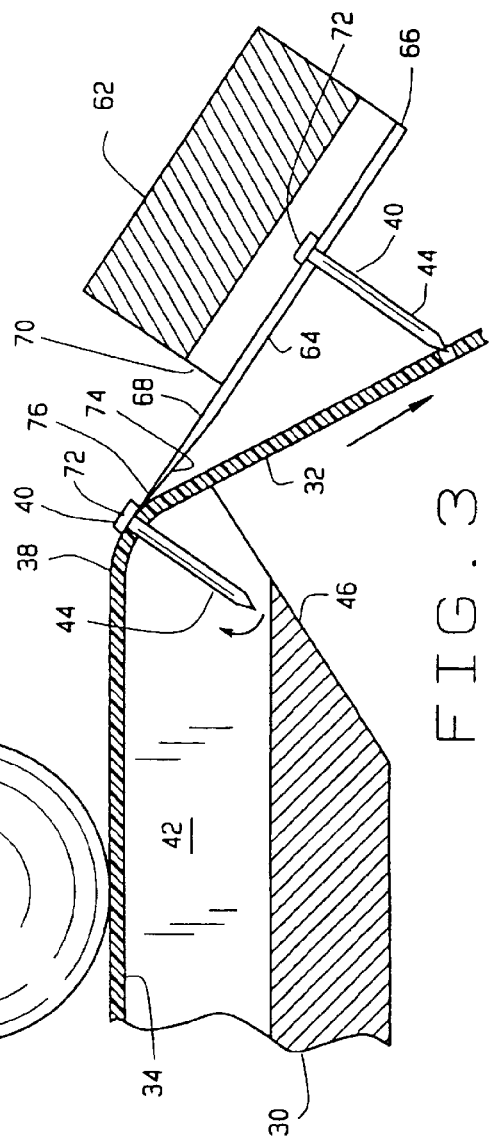

METHOD AND APPARATUS FOR REMOVING NAILS FROM TAPE

BACKGROUND OF THE INVENTION

The present invention pertains to a method and apparatus for removing nails from tape, and, more specifically, tennis court line tape.

On clay tennis courts, a heavy-duty plastic tape is used to define the boundary lines of the tennis court. The tape is secured to the ground with nails intermittently spaced approximately 3 to 4 inches apart along its length. In a typical configuration of the tennis court line tape, the tape has two lines of nails, each being positioned along the longitudinal borders of the tape where the lateral arrangement between the two lines is staggered. Several different lengths of tape are used depending upon whether the tape is used to define a baseline or a service line or some other boundary of the tennis court.

Periodically, especially in cold weather climates, the tape is removed from the court to allow resurfacing of the court and other maintenance. When removing the tape from the court, the tape is pulled up out of the court and set aside with the nails extending out of the tape.

If the tape is in satisfactory condition, it can be reused, but first the nails must be removed. However, this task has been labor intensive and arduous. On one line of tape, there can be several hundred nails, and each nail must be removed manually by using pliers or the claw of a hammer. Consequently, the manual labor involved in separating the nails from the tape was often more costly than the purchase of new tape and nails.

SUMMARY OF THE INVENTION

The present invention overcomes these disadvantages by providing a method and apparatus that efficiently removes the nails from the tape, thus reducing the amount of the labor involved in preparing the tape for reuse and providing a cost-effective alternative to the purchase of new tape and nails.

The present invention includes an apparatus for removing nails from a tape. The apparatus comprises a guide and a claw. The guide directs a path of movement of the tape through the apparatus and is formed to expose the head of the nail from the tape as the tape passes over the guide. The claw engages the nail head as it is exposed and separates the nail from the tape as the tape advances past the claw.

The present invention also includes a method for extracting nails from a tape by providing a guide, drawing the tape along the guide in a manner so as to expose a head of the nail from the tape at a selected position on the guide, and positioning a claw adjacent the selected position of the guide to engage the nail head as it is exposed from the tape and remove the nail from the tape.

Other objects and features of the present invention will be apparent from the description to follow.

BRIEF DESCRIPTIONS OF THE DRAWINGS

FIG. 2 is a plan view of the apparatus of FIG. 1; and

FIG. 3 is a partial cross-sectional view of the apparatus taken along line 3—3 of FIG. 2.

DETAILED DESCRIPTION OF THE PREFERRED EMBODIMENT

Figure 1:
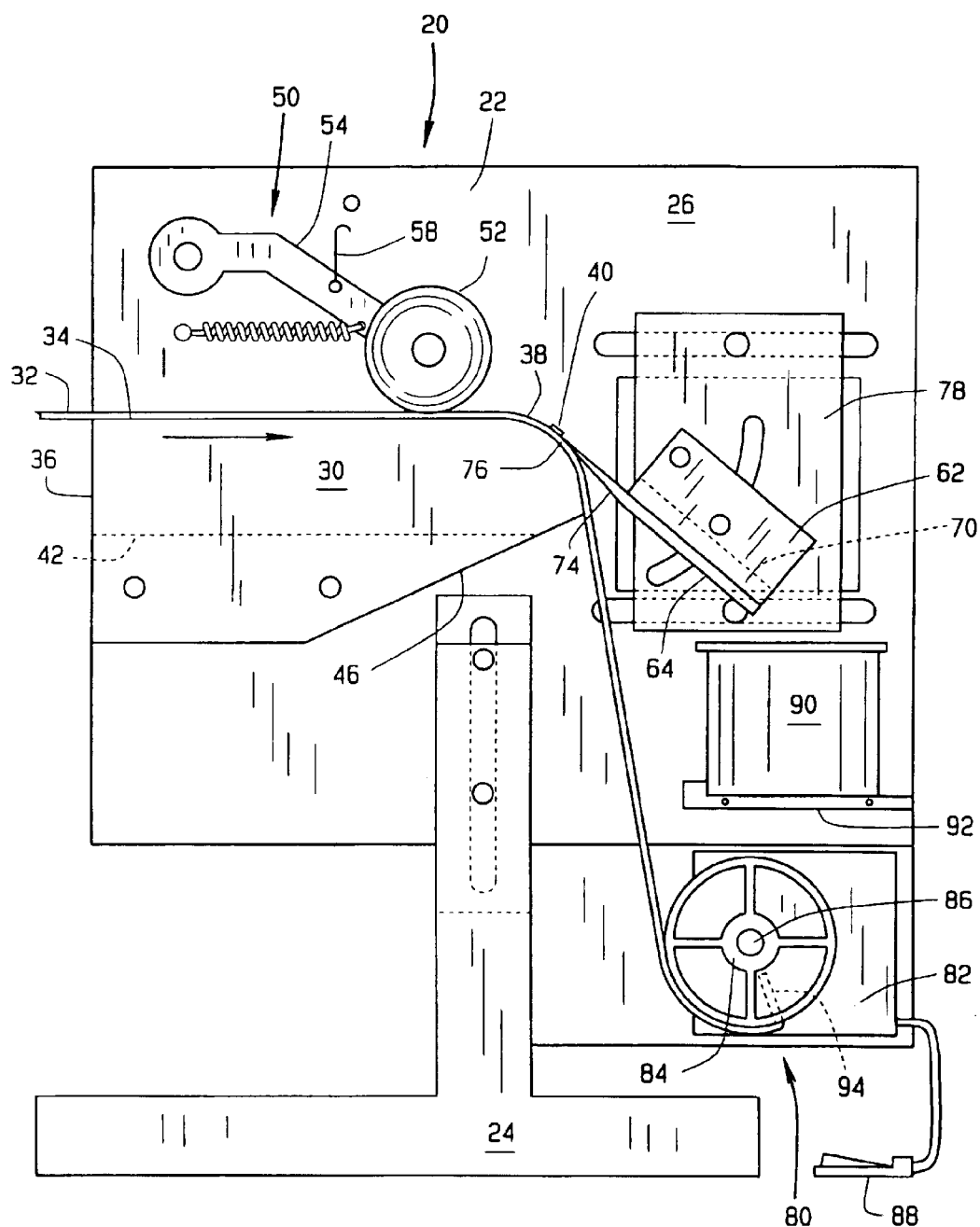
FIG. 1 is a side view of an apparatus of the present invention.

With reference to the drawings, FIG. 1 shows a side view of an apparatus 20 of the present invention. The apparatus 20 comprises a frame 22 and a stand 24 for supporting the frame above the ground. The stand 24 is preferably designed to position the frame off the ground at a height that may be adjusted by a user of the apparatus as desired during its operation. The frame 22 supports several components of the apparatus and is preferably formed by arranging two rectangular shaped frame panels 26 vertically in a spaced, parallel, face-to-face relationship. The several components of the apparatus 20 may then be arranged and supported in the space between the panels. Each of the panels may be formed with access holes, doors and/or removable panels to allow a user access to the components. The apparatus is preferably portable and lightweight so that it may be easily relocated as desired to process the tape.

The apparatus further comprises a guide 30 that is preferably attached to both of the frame panels 26 for support. The guide is preferably a generally rectangular shaped member having a width dimensioned to accommodate the width of a tennis court line tape 32 to be drawn through the apparatus. The guide defines a path of travel of the tape through the apparatus and has a top surface 34 over which the tape travels from a feed end 36 of the guide to a transition end 38 of the guide. The transition end 38 is preferably formed to change the direction in the path of travel of the tape. Preferably, the transition end is curved so as to provide the change of direction while preventing damage to the tape from severe bending as the tape passes over the guide. The function of the guide transition end will be explained in greater detail below.

FIG. 2 shows a typical configuration of the tennis court line tape 32. As stated previously, the typical tape has two lines of nails, each being positioned along the longitudinal borders of the tape. The longitudinal spacing of the nails 40 in each line is approximately 3 to 4 inches apart, and laterally between the two lines, the alignment of the nails is staggered. As will become apparent to those skilled in the art upon review of the following description, the apparatus may be constructed to accept other arrangements of the tape and nails so as to increase its versatility.

The guide 30 is arranged to accommodate the width of the tape and the arrangement of nails, and accordingly, the guide 30 may be removably attached to the frame panels 26 to allow it to be changed out with another specific guide for a different style of tape. The guide is preferably formed from an aluminum, plastic or nylon material, which has a low friction coefficient and permits the tape to be drawn through the apparatus with minimal drag. Preferably, the guide 30 is formed with guide slots 42 that correspond to the lateral spacing between the lines of nails (FIG. 2). The guide slots 42 are sized to accommodate sliding movement of a nail shank 44 in the guide slot. The guide slots have a depth that is greater than the length of the nail shank so that the nails carried in the tape will not bottom out in the slot as the tape travels over the top surface 34 (FIG. 3). Preferably, the guide slots 42 extend from the feed end 36 of the guide to the transition end 38 of the guide. At the transition end, the depth of the slots may be sized to allow the nail to rotate clockwise (FIG. 3) in the slot when the tape changes direction. The guide transition end may also be relieved on its underside, for instance, with a notch 46, to allow the nail to rotate relative to the guide.

A roller assembly 50 is provided opposite the guide top surface 34 and comprises a roller 52 rotatably attached to two roller arms 54 that are each pivotally attached to a respective frame panel. The roller assembly 50 is configured to move the roller 52 between a raised position and an engaged position relative to the guide. In the engaged position, the roller is preferably urged in a clockwise direction (FIG. 1) against the guide top surface by a spring mechanism 56 extending between each roller arm and the respective frame panel. In this way, the roller assembly 50 holds the tape 32 flat against the top surface and helps to tension the tape as the tape travels through the apparatus. The roller arm also pivots in a counter-clockwise direction (FIG. 1) to the raised position where the roller is spaced from the top surface to allow a lead end of the tape to be placed in the apparatus. To maintain the roller and roller arm in the raised positioned, a latch 58 is provided. Preferably, the roller is made from a rubber-like, deformable material that will not become "nicked" or marred from the nails and that accommodates the protrusion of the nail heads while maintaining pressure on the tape.

Adjacent the guide transition end 38 is a claw 62, which is a generally rectangular shaped member pivotably attached to both of the frame panels for support. The claw has a generally flat extraction plate 64 located at its bottom that extends outward from the claw in the general direction of the guide. The extraction plate preferably has slots 66 arranged to match the lateral spacing between the lines of nails of the tape (FIG. 2). This spacing also corresponds to the lateral spacing between the guide slots 42, and as with the guide slots, the extraction plate slots are also sized to accommodate sliding motion of the nail shank 44. Additionally, as with the guide, the claw may also be removably attached to the apparatus to allow the claw to be changed out with a specific claw for a different style of tape.

The extraction plate 64 has a flat sliding surface 68 that extends along each side of the extraction plate slots 66, and each extraction plate slot is aligned with a key way 70 in the claw 62 (FIG. 2). The sliding surface 68 engages and supports a head 72 of the nail so that the nail hangs in the extraction plate slot (FIG. 3). The key way 70 is dimensioned to accommodate the size of the nail head so that the nail can pass freely from one end of the claw to the other end, as it slides along the extraction plate slot. The extraction plate may be formed by arranging three separate plate members on the bottom of the claw. The plate members may be centered relative to the claw key ways with a spacing between the plate members that corresponds to the width of each of the extraction plate slots. Additionally, the entrance to the extraction plate slot may be provided with an angled or tapered lead-in to allow the nail shank to be received in the extraction plate slot with minor mis-match between the claw and the tape.

On the side of the extraction plate opposite the sliding surface 68, a relief 74 is formed in a distal end 76 of the extraction plate to provide back clearance for the extraction plate when the claw is positioned adjacent the tape. Preferably, the relief 74 is a chamfer on the extraction plate distal end 76 that creates a sharp edge which allows the extraction plate to be placed in relatively close proximity to the tape to engage the nail head 72. Preferably, the claw and the extraction plate are made from a steel material, which can resist wear and the repeated impact of the nail head hitting the extraction plate.

The claw 62 is preferably pivotally attached to the frame panels thereby allowing the extraction plate to be positioned at an oblique angle to the path of travel of the tape through the apparatus. Preferably, the angle is adjustable, as will be explained. Additionally, the claw 62 is preferably adjustably positionable laterally relative to the guide 30 (left and right as shown in FIG. 1) between a retracted position and an engaged position. In the retracted position, the extraction plate is spaced from the transition end 38 so that the tape can be placed over the guide top surface 34 and between the guide transition end and the claw. In the engaged position, the extraction plate is moved in close proximity to the tape so that it can engage the nail head. The pivoting and lateral motion of the claw may be provided through a subslide 78 where the claw is pivotally attached to the subslide and the subslide is slidably attached to a frame panel. The pivoting and lateral motion of the claw may also be provided by arranging the pivot point of the claw to slide laterally relative to the frame panels. Additionally, the claw may be arranged to pivot relative to the frame through a pivot connection, while the guide is arranged for lateral motion (left and right as shown in FIG. 1) relative to the claw between the retracted and engaged positions described above.

The apparatus is also provided with a tape advancement mechanism 80 comprising a motor 82 rotatably coupled to a spool 84. In operation, the tape is directed through the apparatus over the guide to the tape advancement mechanism. The motor 82 is then operated to wind the tape 32 on the spool 84. A shaft 86 of the motor may be directly coupled to the spool or may be operably connected to the spool through a linkage assembly. Preferably, the speed of rotation of the spool is variable and controlled as desired by the operator. This may be accomplished through use of a variable speed motor or through the linkage assembly. Operation of the motor, including adjustment of the speed of rotation of the spool, may be controlled by a foot pedal 88 which allows the operator freedom to use his or her hands, as necessary. Access to the spool may be provided through a removable panel or door in the frame panel.

Below the claw 62 opposite the extraction plate distal end 76, a nail collector 90 is provided to collect nails passing through the claw 62. The nails entering the extraction plate slots slide supported by their nail heads on the extraction plate sliding surface under the action of gravity created by the angled arrangement of the extraction plate and/or other nails entering the extraction plate slot and pushing the lead nails along. The nails pass through the claw and drop into the nail collector 90. Preferably, the nail collector is positioned on a shelf 92 supported by both of the frame panels where the nail collector can be easily accessed at the open area between the frame panels at the right side of the apparatus (FIG. 1).

Operation

To start operation of the apparatus 20, the claw is spaced from the guide and each of the roller arms is held in its raised position off the guide top surface with the latch. Next, the first few nails on the lead end of the tape are removed and the lead end of the tape is directed over the guide top surface between the guide and the roller. The lead end of the tape is then directed over the transition end and to the spool of the tape advancement mechanism. The lead end of the tape is preferably secured in a slot 94 in a hub of the spool 84. Each of the roller arms 54 is released from its latch and rotated clockwise (FIG. 1) to the engaged position so that the roller engages the tape against the guide top surface. Next, the tape advancement mechanism is started to slowly advance the tape, take up slack and tension the tape between the roller and the tape advancement mechanism thereby allowing the tape to conform to the guide. Then, the tape advancement mechanism is temporarily stopped, and the claw is moved laterally to its engaged position and rotated to the desired angle so that the extraction plate is in position to engage the nail heads. The lateral and angular adjustment of the claw may be performed, as necessary.

Once in position, the tape advancement mechanism is started and the nails carried by the advancing tape enter the guide slots at the guide feed end and travel through the guide. As a nail passes under the roller, the nail head is somewhat flattened against the tape as the nail is pushed back through the tape into the guide slot. As the nails carried by the tape pass over the guide transition end, the change in the direction of the path of travel of the tape causes the nail heads to become exposed (separates slightly) from the tape. The tape may have a path of travel through the apparatus in any number of directions, and the tape's relative change in any one direction may be used as a selected extraction point to separate the nails from the tape. For example, as shown in FIG. 1, the tape changes its path of travel at the guide transition end 38 from a left to right direction to a diagonally downward direction as it passes over a curved section of the guide. Because the tape is flexible and the nail rigid, the tape as it travels over the guide transition end 38 conforms to the guide and is pulled away from the nail head. The nail carried by the tape also changes its direction of travel as it passes over the transition end. Thus, the transition end in effect causes the nail head to be exposed from the tape. The tension in the tape between the roller and the tape advancement mechanism enhances the effect of exposing the nail head from the tape.

By forming the guide 30 with a curved transition end 38, the tape is bent away from the nail head gradually without causing damage to the tape from severe bending. The relief 46 on the underside of the guide at the transition end 38 allows the nail to more freely rotate with the change in direction of the path of travel of the tape. The change in the direction of the path of travel of the tape at the transition end creates a gap between the tape and the nail head. The extraction plate distal end 76 is positioned to be received in the gap and the extraction plate relief 74 allows the extraction plate to be placed in very close proximity to the tape where the extraction plate sliding surface 68 can engage the nail head 72.

When the nail head is engaged by the extraction plate sliding surface, the action of tape advancing past the claw causes the nail head to slide along the extraction plate sliding surface until the nail shank is received in the extraction plate slot. Also, the action of the tape advancing past the claw and the angle between the extraction plate and the tape causes the nail to be drawn out of and separated from the tape. The angle between the extraction plate and the tape may be adjusted to change the rate of separation of the nail from the tape. However, the angle is preferably relatively acute to allow a gradual separation of the nail from the tape, which prevents undue stress on the tape. As subsequent nails enter the extraction plate slot, the nails tend to push the lead nails along through the claw. The angled orientation of the extraction plate 64 also enhances this effect through the action of gravity. The nails separated from the tape continue to slide along the extraction plate slot through the claw key way 70 until the nails clear the claw 62 and fall into the nail collector 90.

The tape with the nails extracted continues to advance to the tape advancement mechanism 80 where the tape is coiled on the spool 84. When the back end of the tape clears the roller 52, the tape advancement mechanism is stopped and the spool is removed, and it may be labeled and/or coded to indicate the size and/or type of tape.

Although the above description refers to removing nails from tennis court line tape, it should be noted that the apparatus and methods described herein could be used in other applications where it is desired to remove nails from tape.

In view of the above, it will be seen that several objects of the invention are achieved and other advantageous results obtained. Various changes could be made in the above construction and methods without departing from the scope of the invention. It is intended that all matter contained in the above description or shown in the accompanying drawings shall be interpreted as illustrative and not in any limiting sense.

What is claimed is:

1. An apparatus for removing nails from a tape, the apparatus comprising:

a guide directing a path of movement of the tape through the apparatus, the guide having a transition end over which the tape passes as the tape moves through the apparatus, the guide transition end being adapted to form a bend in the tape thereby exposing a head of the nail from the tape as the tape passes over the guide transition end; and a claw being adapted to engage the nail head as the nail head is exposed when the tape passes over the guide transition end;

wherein the guide transition end is curved to create a gap between the nail head and the tape as the tape passes over the guide transition end.

2. An apparatus for removing nails from a tape, the apparatus comprising:

a guide directing a path of movement of the tape through the apparatus, the guide having a transition end over which the tape passes as the tape moves through the apparatus, the guide transition end being adapted to form a bend in the tape thereby exposing a head of the nail from the tape as the tape passes over the guide transition end; and a claw being adapted to engage the nail head as the nail head is exposed when the tape passes over the guide transition end;

wherein the guide has at least one slot in a top surface of the guide extending through the guide transition end, the at least one slot is dimensioned to accommodate length of the nail, the at least one slot permits rotation of the nail within the slot as the tape passes over the guide transition end.

3. An apparatus for removing nails from a tape, the apparatus comprising:

a guide directing a path of movement of the tape through the apparatus, the guide having a transition end over which the tape passes as the tape moves through the apparatus, the guide transition end being adapted to form a bend in the tape thereby exposing a head of the nail from the tape as the tape passes over the guide transition end; and a claw being adapted to engage the nail head as the nail head is exposed when the tape passes over the guide transition end;

wherein the guide transition end is formed with a relief to allow the nail to change its relative direction of travel through the apparatus as the tape passes through the guide transition end.

4. An apparatus for removing nails from a tape, the apparatus comprising:

a guide directing a path of movement of the tape through the apparatus, the guide having a transition end over which the tape passes as the tape moves through the apparatus, the guide transition end being adapted to form a bend in the tape thereby exposing a head of the nail from the tape as the tape passes over the guide transition end; and a claw being adapted to engage the nail head as the nail head is exposed when the tape passes over the guide transition end;

wherein the guide transition end creates relative movement between the tape and the nail when the tape passes over the guide transition end.

5. An apparatus for removing nails from a tape, the apparatus comprising:

a guide directing a path of movement of the tape through the apparatus, the guide having a transition end over which the tape passes as the tape moves through the apparatus, the guide transition end being adapted to form a bend in the tape thereby exposing a head of the nail from the tape as the tape passes over the guide transition end; and a claw being adapted to engage the nail head as the nail head is exposed when the tape passes over the guide transition end;

wherein the claw comprises an extraction plate adapted to be positioned at an oblique angle to the path of movement of the tape, the extraction plate has a sliding surface adapted to capture the nail head as it is exposed from the tape and a slot adapted to slidingly receive a shank of the nail as the tape passes beyond the extraction plate whereby the motion of the tape relative to the extraction plate separates the nail from the tape.

6. The apparatus claim 5 wherein the extraction plate sliding surface has a relief formed on its opposite side, the extraction plate relief substantially faces the tape as the tape passes over the guide transition end.

7. The apparatus of claim 5 wherein the extraction plate is adapted to allow the nails to be emptied from the claw as the nails are separated from the tape.

8. The apparatus of claim 5 wherein the angle between the extraction plate and the tape is adjustably set.

9. An apparatus for removing nails from a tape, the apparatus comprising:

a tape advancement mechanism being adapted to advance the tape through the apparatus;

a roller being adapted to maintain tension in the tape as the tape advances through the apparatus;

a guide being positioned opposite the roller and adapted to support the tape against the roller whereby the guide and the roller tension the tape as the tape is advanced through the apparatus by the tape advancement mechanism, the guide being adapted to expose a head of the nail from the tape as the tape travels from the roller to the tape advancement mechanism; and a claw being adapted to engage the nail head when the nail head is exposed from the tape as the tape travels over the guide from the roller to the tape advancement mechanism.

10. The apparatus of claim 9 wherein the guide is formed to change a direction of travel of the tape through the apparatus and the nail head is exposed from the tape when the tape changes its direction of travel.

11. The apparatus of claim 10 wherein the claw engages the nail head when the tape changes its relative direction of travel as the tape passes over the guide from the roller to the tape advancement mechanism.

12. The apparatus of claim 9 wherein the claw has an extraction plate adapted to be received in a gap formed between the nail head and the tape when the nail head is exposed from the tape.

13. The apparatus of claim 12 wherein the extraction plate has a sliding surface adapted to capture the nail head as it is exposed from the tape and a slot adapted to slidingly receive a shank of the nail as the tape passes beyond the extraction plate whereby the motion of the tape relative to the extraction plate separates the nail from the tape.

14. The apparatus of claim 12 wherein the extraction plate as a relief formed on its distal end thereby allowing the extraction plate to be placed sufficiently close to the tape to engage the nail head as the tape changes its relative direction of travel.

15. The apparatus of claim 9 wherein the claw is adjustably rotatable relative to the tape.

16. The apparatus of claim 9 wherein the tape advancement mechanism winds the tape on a spool in advancing the tape through the apparatus.

17. A method comprising:

providing a tape with nails extending therethrough;

drawing the tape along a guide in a manner so as to bend the tape and expose a head of the nail from the tape at a selected position on the guide; and positioning a claw adjacent the selected position of the guide to engage the nail head and remove the nail from the tape;

wherein the step of positioning the claw includes rotating the claw relative to the tape so as to create an angle between the claw and a path of travel of the tape whereby the relative motion between the claw and the tape cause the nail to be separated from the tape when the claw engages the nail head; and wherein the step of creating the angle includes rotating the claw to a position whereby the at least one nail removed from the tape is emptied from the claw as the tape is drawn past the claw.

18. The method of claim 17 wherein the step of drawing the tape along the guide comprises creating tension in the tape so that the tape conforms to the guide.

19. The method of claim 17 wherein the step of drawing the tape further comprises winding the tape on a spool after the tapes passes the claw and the nails are removed.

20. The method of claim 17 further comprising changing a relative direction of travel of the tape at the selected position on the guide.

21. The method of claim 20 wherein the step of changing the direction of the path of travel of the tape includes bending the tape thereby creating a gap between the nail head and the tape as the tape is drawn over the selected position.

* * * * *